(12) United States Patent
Schubert et al.

(10) Patent No.: US 9,570,894 B2
(45) Date of Patent: Feb. 14, 2017

(54) NON-RETURN VALVE FOR A RESIN INJECTION SYSTEM AND RESIN INJECTION SYSTEM INCORPORATING SAME

(71) Applicant: 3M INNOVATIVE PROPERTIES COMPANY, St. Paul, MN (US)

(72) Inventors: Bernd Schubert, Neuss (DE); Werner Roehling, Neuss (DE); Rolf Karkowski, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 264 days.

(21) Appl. No.: 14/384,403

(22) PCT Filed: Mar. 1, 2013

(86) PCT No.: PCT/US2013/028536
§ 371 (c)(1),
(2) Date: Sep. 11, 2014

(87) PCT Pub. No.: WO2013/148058
PCT Pub. Date: Oct. 3, 2013

(65) Prior Publication Data
US 2015/0107776 A1 Apr. 23, 2015

(30) Foreign Application Priority Data
Mar. 29, 2012 (EP) .................... 12161997

(51) Int. Cl.
*H01B 13/00* (2006.01)
*H01B 17/34* (2006.01)
(Continued)

(52) U.S. Cl.
CPC .................. *H02G 1/16* (2013.01); *H02G 1/14* (2013.01); *H02G 15/003* (2013.01);
(Continued)

(58) Field of Classification Search
CPC ...... H02G 15/003; H02G 15/10; H02G 15/18; H02G 1/14; H02G 1/16; Y10T 29/49197; Y10T 137/87917; Y10T 137/7908; Y10T 137/7909; Y10T 137/7921; Y10T 137/7913; Y10T 137/7914; Y10T 137/7915; B29C 67/0037; B29C 65/483; B29C 66/50; B29C 66/55; B29C 2045/14557
(Continued)

(56) References Cited

U.S. PATENT DOCUMENTS 8,753,041 B2    6/2014  Gray

FOREIGN PATENT DOCUMENTS

DE      10040398       3/2001
FR      2272322       12/1975
(Continued)

OTHER PUBLICATIONS

International Search Report for PCT International Application No. PCT/US2013/028536 mailed on May 9, 2014, 3pgs.

*Primary Examiner* — Philip Tucker
*Assistant Examiner* — Brian R Slawski
(74) *Attorney, Agent, or Firm* — Gregg H. Rosenblatt

(57) ABSTRACT

The present invention provides a non-return valve for a resin injection system, especially for use in electrical cable joints, comprising: a valve housing which includes an outlet for a fluid flowing through the valve; and a valve body which is held by the valve housing and is freely movable between a closed position, in which the outlet is substantially sealed or closed to fluid flow by the valve body, and an open position, in which the outlet is substantially open to fluid flow. Thus, with the present invention, the valve body can be loosely held by the valve housing and the valve need not include any spring means to bias the valve body to the closed position.

(Continued)

The invention also provides a resin injection system for sealing a localized breach in an object, such as an electrical cable joint.

14 Claims, 9 Drawing Sheets

(51) Int. Cl.

| | | |
|---|---|---|
| B29C 73/00 | (2006.01) | |
| B32B 43/00 | (2006.01) | |
| B65H 81/00 | (2006.01) | |
| H01F 41/12 | (2006.01) | |
| B29C 70/34 | (2006.01) | |
| C09J 5/00 | (2006.01) | |
| B65C 9/26 | (2006.01) | |
| B29C 65/78 | (2006.01) | |
| B29C 65/00 | (2006.01) | |
| B32B 37/00 | (2006.01) | |
| H02G 3/02 | (2006.01) | |
| H02G 15/02 | (2006.01) | |
| H02G 15/08 | (2006.01) | |
| H01R 4/00 | (2006.01) | |
| H02G 3/06 | (2006.01) | |
| H02G 1/16 | (2006.01) | |
| H02G 1/14 | (2006.01) | |
| H02G 15/00 | (2006.01) | |
| B29C 65/48 | (2006.01) | |
| B29C 45/14 | (2006.01) | |

(52) U.S. Cl.
CPC .............. *B29C 65/483* (2013.01); *B29C 66/55* (2013.01); *B29C 2045/14557* (2013.01)

(58) Field of Classification Search
USPC ........ 156/47, 48, 49, 51, 52, 53, 54, 55, 56, 60,156/90, 94, 98, 184, 185, 187, 191, 195, 293,156/294, 305, 349, 391, 423; 174/76, 77 R, 84 R, 174/21 R; 277/602, 605, 607
See application file for complete search history.

(56) References Cited

FOREIGN PATENT DOCUMENTS

| | | |
|---|---|---|
| FR | 2702604 | 9/1994 |
| GB | 1117169 | 6/1968 |
| JP | 10-42420 | 2/1998 |
| NL | 1002859 | 10/1997 |

NON-RETURN VALVE FOR A RESIN INJECTION SYSTEM AND RESIN INJECTION SYSTEM INCORPORATING SAME

TECHNICAL FIELD

The present invention relates to a non-return valve for a resin injection system, particularly for use in joining electrical cables. The present invention also relates to a resin injection system incorporating such a non-return valve, especially for use in electrical cable joints.

BACKGROUND OF THE INVENTION

Resin injection systems for use in repairing pipes or conduits and for use in sealing joints formed in communication or electrical cables are generally known. Systems of this type are referred to, for example, in the French patent publication FR 2 702 604 A1 and in the German patent publication DE 100 40 398 A1.

In FR 2 702 604 A1, a resin bag for the resin injection system is illustrated in FIGS. 1 to 3 of the drawings and a non-return valve for the system is illustrated in FIGS. 4 and 5. The non-return valve in this example includes a conventional coil spring that biases a frusto-conically shaped valve body into a closed position seated within a conical recess.

In DE 100 40 398 A1, another example of a non-return valve is illustrated in FIG. 1 of the drawings as part of a resin injection system for sealing or repairing a crack in a gas line, with the non-return valve illustrated in detail in FIGS. 2 and 3. The non-return valve in this example includes curved spring members that are integrally formed with a valve body for biasing the valve body into a closed position seated within a conical recess. Although the non-return valve proposed in DE 100 40 398 A1 has only two parts, i.e. compared with the three-part configuration described in FR 2 702 604 A1, the curved spring members that are integrally formed with the valve body require precise tolerances and render manufacture of the valve quite intricate and therefore relatively costly. Further, the curved spring members may be susceptible to fracture or to release in use, creating problems during resin injection.

SUMMARY OF THE INVENTION

Thus, it is an object of at least one embodiment of the invention to provide an improved non-return valve for a resin injection system, as well as to provide an improved resin injection system incorporating such a valve, especially for use in the joining of electrical cables.

In accordance with at least one embodiment of the present invention, a non-return valve having the features recited in either claim 1 or claim 6 and a resin injection system as recited in claim 16 are provided. Preferred features of the invention are recited in the dependent claims.

According to one aspect, therefore, the invention provides a non-return valve for a resin injection system, especially for use in electrical cable joints, comprising: a valve housing which includes an outlet for a fluid flowing through the valve; and a valve body which is held by the valve housing and is freely movable between a closed position, in which the outlet is substantially sealed or closed to fluid flow by the valve body, and an open position, in which the outlet is substantially open to fluid flow.

The non-return valve of the invention therefore has a simple and low cost structure which is based on a new operational concept for the valve. In particular, as a result of this new operational concept, the non-return valve of the invention is able to completely omit any spring means with which the valve body is biased to the closed position. That is, the valve need not include any spring means to bias the valve body to the closed position. In other words, the valve body is preferably not biased to the closed position, but rather is loosely held by the valve housing, e.g. held against separation from the valve housing, and is freely movable between the closed position and the open position. In this regard it will be noted and understood that, as the valve of the invention is a non-return valve, when the valve body is in the closed position, the outlet is substantially sealed or closed to return fluid flow, i.e. via the outlet back through the valve.

In a preferred embodiment, the valve body of the non-return valve includes a contact member which projects beyond or out of the valve housing in the open position for contact with a resilient spacer material of the resin injection system. In this way, the interaction of the valve body with the resilient spacer material of the resin injection system, i.e. via the contact member, can operate to bias the valve body from the open position back to the closed position during use.

In a preferred embodiment, the valve body includes a closure member which is larger than the valve outlet such that the closure member substantially fully covers and/or obstructs the outlet in the closed position. Preferably, the valve housing comprises a flange member that is configured as a footing to at least partially support the valve upon spacer material of the resin injection system. The valve body, and more particularly, the closure member, may be configured to seat against the flange member in the closed position and/or to project out of the valve housing or beyond the flange member in the open position. In this manner, the closure member of the valve body preferably fulfils the role of the "contact member" for contact with the resilient spacer material of the resin injection system.

According to another aspect, therefore, the invention provides a non-return valve for a resin injection system, especially for use with electrical cable joints, comprising: a valve housing which includes an outlet for a fluid flowing through the valve; and a valve body which is movable between an open position, in which the outlet is substantially open to fluid flow, and a closed position, in which the outlet is substantially sealed or closed to fluid flow by a closure member of the valve body; wherein the valve housing comprises a flange member configured as a footing for the valve, and wherein the closure member is configured to seat against the flange member in the closed position and/or to project beyond the flange member in the open position.

In a preferred embodiment, the valve housing comprises a tubular member and the valve body is at least partially held by and movable within the tubular member, the outlet of the valve being at one end region of the tubular member. The tubular member may be circular cylindrical and the movement of the valve body between the open and closed positions are preferably in the axial direction of the tubular member. The closure member is preferably in the form of a plate member, which may have a diameter larger than an inner diameter of the tubular member, such that the plate member substantially fully covers and/or obstructs the outlet at the end region of the tubular member in the closed position. Desirably, a valve seat against which the closure member engages or seats in the closed position is arranged around the outlet at said end region of the tubular member.

The flange member typically also extends radially outwardly from that end region of the tubular member.

In a preferred embodiment, the valve housing includes an inlet configured to receive a nozzle or spout of a resin container for introducing resin through the valve. The inlet may also include connection means, such as a screw-thread or snap-fit mechanism, for effecting mechanical connection with the nozzle or spout of the resin container.

In a preferred embodiment, the valve body includes one or more guide member attached to the closure member for assisting and/or guiding movement of the valve body between the closed and open positions. In this regard, each guide member can be sized and shaped to at least partially conform to an inner cavity of the tubular member of the housing. The one or more guide member is preferably elongate and extends from the closure member of the valve body into the valve housing in a direction parallel to the direction of movement of the valve body between the open and closed positions. Thus, the guide member preferably extends in the axial direction of the tubular member. Furthermore, each guide member may present an engagement surface for engagement by the nozzle or spout of the resin container received in the inlet of the valve housing. In this way, an end of the nozzle or spout can engage the one or more guide member at its respective engagement surface and press the valve body into the open position. In this way, the valve body is preferably configured to be moved to the open position when the nozzle or spout is fully inserted into the inlet.

According to a further aspect, therefore, the invention provides a non-return valve for a resin injection system, especially for use with electrical cable joints, comprising: a valve housing which includes an inlet for introducing resin into the valve and an outlet for the resin flowing through the valve; and a valve body which is movable between a closed position, in which the outlet is substantially sealed or closed to fluid flow by a closure member of the valve body, and an open position, in which the outlet is substantially open to fluid flow; wherein the valve body includes one or more guide member attached to the closure member for assisting movement of the valve body from the closed position to the open position, wherein the guide member presents an engagement surface for engagement by a nozzle or spout of a resin container inserted into the inlet of the valve housing, such that the valve body can be moved or pushed by the nozzle or spout into the open position.

In a preferred embodiment, the one or more guide member is accommodated within a channel in the valve housing, whereby the channel cooperates with the one or more guide member to maintain a desired orientation of the valve body during its movement between the closed position and the open position.

In a preferred embodiment, the valve body includes at least one latch member for engagement with a retainer element of the valve housing to limit movement of the valve body at the open position and to retain the valve body connected with the valve housing. The at least one latch member is preferably elongate and extends from the closure member of the valve body into the valve housing in a direction parallel to a direction of movement of the valve body between the closed position and the open position. The latch member is preferably resiliently deformable and may include a lateral projection, such as a lug, at an end region thereof for engagement with the retainer element of the valve housing in the open position. The retainer element, on the other hand, may comprise a radially inwardly projecting shoulder or edge region within the valve housing.

In a preferred embodiment, the valve housing further includes means for cutting, piercing or breaking a seal formed in a nozzle or spout of a resin container inserted into an inlet of the valve housing. The means for cutting, piercing or breaking the seal preferably comprise one or more spike or blade member which may engage the seal when the nozzle or spout of the resin container is inserted into the inlet of the valve housing.

According to yet another aspect, the present invention provides a resin injection system, also known as a resin pressure system, for sealing a cable joint or localised breach in an object, e.g. for sealing an electrical cable joint, comprising: a resilient spacer material for application to the joint or breach, the spacer material being at least locally permeable to a fluid; a non-return valve according to the invention as described generally above, with respect to any one of the embodiments, for positioning on the spacer material applied to the joint or breach; and a fluid resin for introduction through the valve into the spacer material applied to the joint or breach. With the resin injection system or resin pressure system of the invention, a curable resin material (for example, a curable epoxy resin or polyurethane resin, either of which may be provided in a two-part formulation) is introduced under pressure into a joint or breach to be sealed. In this connection, the term "breach" will be understood to include a gap in the insulation covering of a cable (e.g. an electrical cable) resulting from the formation of a cable splice or cable joint, as well as a break, rupture or fissure in a pipe of conduit. The joint or breach is first covered by the resilient spacer material and the resin is then introduced in a fluid form, via the valve, into the resilient spacer material and into the joint or breach, where it cures and hardens to form a highly robust and durable seal in and around the joint or breach.

In a preferred embodiment, the spacer material is formed as a flexible sheet or strip which can be wrapped around the object having the joint or breach to be sealed. In this regard, the spacer material may be substantially porous and/or spongy and may have a substantially open structure allowing easy permeation of the resin fluid. The system may therefore include means for substantially confining the fluid resin introduced into the spacer material, in order to retain the fluid resin localised at the joint or breach until the resin cures. In this regard, the confining means preferably comprises a substantially fluid impermeable cover or layer for covering or enclosing the spacer material applied to the joint or breach to prevent escape of the fluid resin introduced under pressure into the resilient spacer material and into the joint or breach. The impermeable cover or layer may, for example, comprise tape which can be wound around the outside of the spacer material applied to the joint or breach. In this way, the tape may also serve to fix the spacer material in position at or around the joint or breach to be sealed and to fix the non-return valve in position on the spacer material, as well as to provide a generally impermeable cover for retaining the fluid resin in and/or around the joint or breach until the resin has cured or set.

In a preferred embodiment, the fluid resin is provided in a container having an outlet which can be connected to the valve housing of the non-return valve for introduction of the resin through the valve into the spacer material applied to the joint or breach. The container is preferably a flexible container, which is able to be deformed by hand, e.g. by squeezing, to force the fluid resin through the outlet of the container, e.g. via a nozzle or spout, for introduction through the non-return valve and into the spacer material under pressure. In this regard, the outlet—e.g. the nozzle or spout—of the resin container is preferably configured to interact with the non-return valve to move the valve body to the open position. The outlet of the container can optionally include connection means, such as a screw-thread or a snap-fit mechanism, for mechanical connection with the inlet of the valve housing of the non-return valve. The resin injection system of the invention is desirably provided in the form of a kit. Thus, in still a further aspect, the invention provides a resin pressure or injection kit for sealing a localised joint or breach in an object, and especially a cable jointing kit for sealing cable joints.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a less abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study, except where specific meanings have otherwise been set forth herein.

DETAILED DESCRIPTION OF THE DRAWINGS

Figure 1:
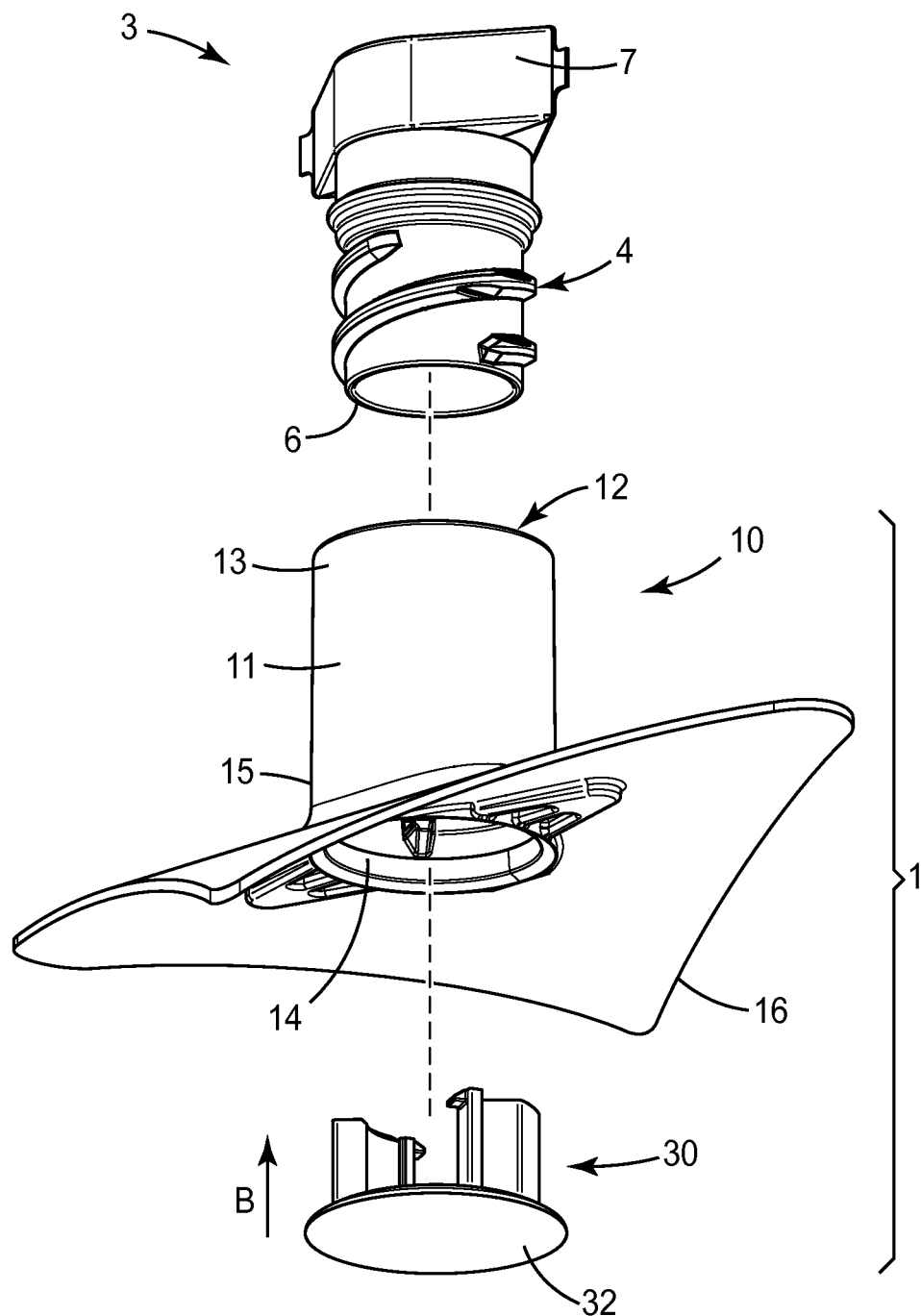
FIG. 1 shows an exploded perspective view of a non-return valve according to an embodiment of the present invention and a nozzle of a resin container.
Figure 2:
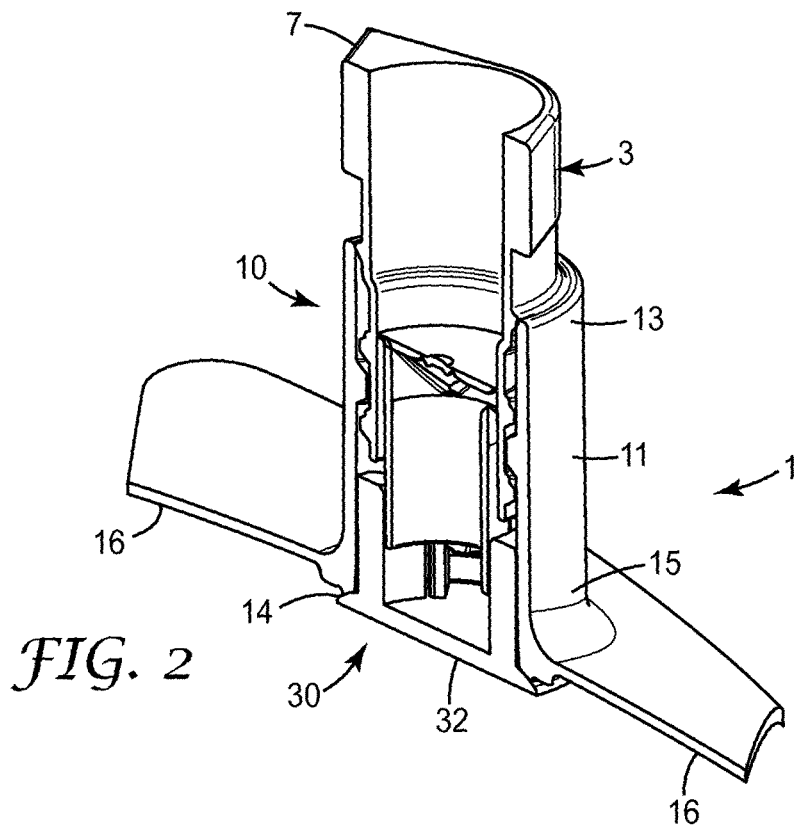
FIG. 2 shows a cross-sectional perspective view of the non-return valve of FIG. 1 in the closed position, assembled with the nozzle of the resin container.
Figure 3:
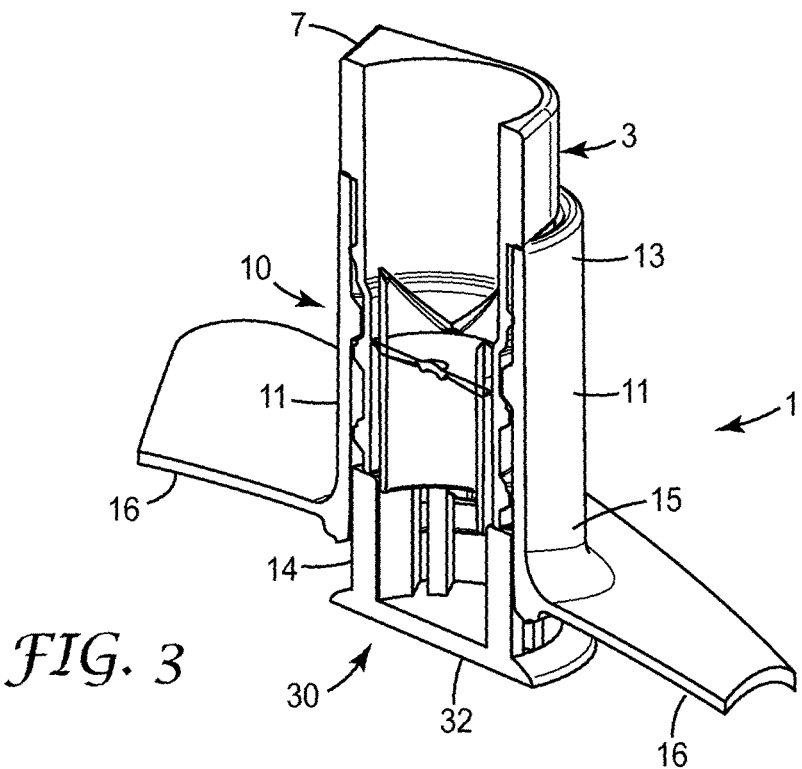
FIG. 3 shows a cross-sectional perspective view of the non-return valve of FIG. 1 in the open position, assembled with the nozzle of the resin container.

With reference firstly to FIGS. 1 to 3 of the drawings, a non-return valve 1 according to an embodiment of the invention for a resin injection system 100 (to be described later in more detail) is illustrated together with a nozzle or spout 3 of a resin container of the system.

The non-return valve 1 of this embodiment includes a valve housing 10 which comprises a cylindrical tubular member 11 and has an inlet 12 in the form of a circular opening at an upper end region 13 thereof and an outlet 14 in the form of a circular opening at a lower end region 15 thereof. Furthermore, at the lower end region 15 of the tubular member 11, the valve housing 10 includes a flange member 16 which extends radially outwardly from the tubular member 11 and is configured as a footing for the non-return valve 1.

The non-return valve 1 of the invention further includes a valve body 30, which in this embodiment is at least partially accommodated in the tubular member 11 and loosely held by the valve housing 10, such that the valve body 30 is freely movable between a closed position (shown in FIG. 2), in which the outlet 14 is substantially sealed or closed to fluid flow—particularly return fluid flow or back flow—by the valve body 30, and an open position (shown in FIG. 3), in which the outlet 14 is substantially open to fluid flow there-through.

With reference to FIGS. 4 to 7 of the drawings, the configuration and structure of the valve body 30 will now be described in more detail. As can be seen in each of FIGS. 4 and 5, the valve body 30 comprises a circular plate member 32 which is sized and configured to substantially fully cover and close the outlet opening 14 of the valve housing 10 in the closed position. In this connection, an annular outer rim 33 at an upper side of the plate member 32 is formed with a slightly tapered or conical surface and is configured to match a corresponding annular valve seat 17 formed in an underside of the flange member 16, surrounding the outlet 14 opening of the tubular member 11 of the valve housing 10. The circular plate member 32 of the valve body 30 therefore forms a closure member for closing or sealing the outlet 14 of the valve housing 10 in the closed position.

Figure 4:
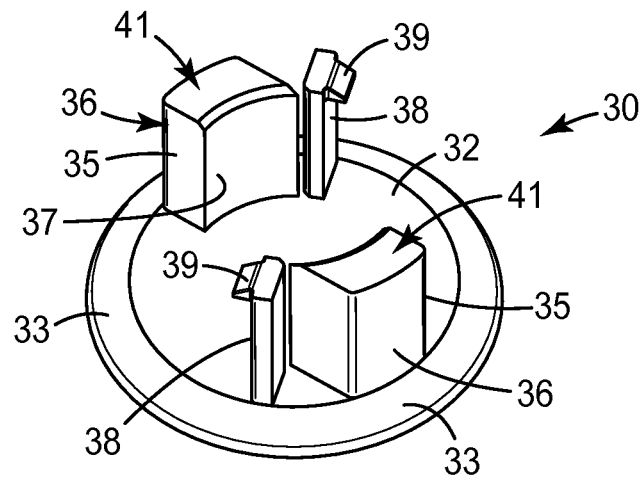
FIG. 4 shows a perspective view of a valve body of a non-return valve according to another embodiment of the invention.
Figure 5:
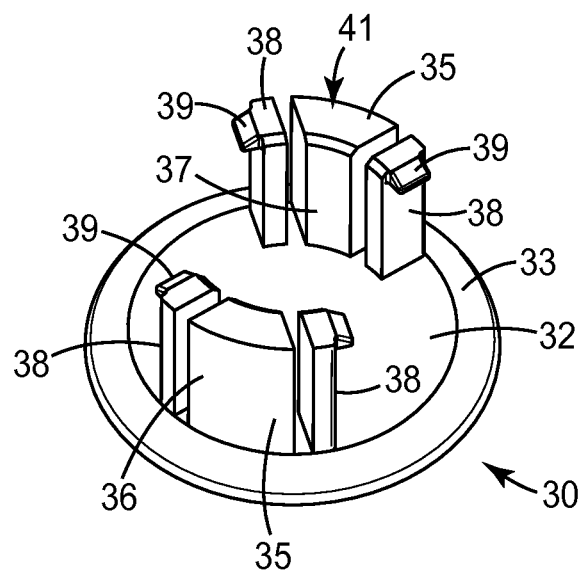
FIG. 5 shows a perspective view of a valve body of a non-return valve according to a further embodiment of the invention.

Upstanding from the plate member 32 of the valve body 30 in each of the embodiments of FIGS. 4 and 5 of the drawings are relatively robust block-like guide members 35. These block-like guide members 35 are typically formed integrally with the plate member 32 and have partially cylindrical outer and inner surfaces 36, 37. These outer surfaces 36 have a diameter which is slightly smaller than an inner diameter of the tubular member 11 of the valve housing 10 such that the outer surfaces 36 of the guide members 35 assist to maintain a proper orientation of the valve body 30 during its movement in the axial direction of the tubular valve housing 10 between the closed position and the open position respectively shown in FIGS. 2 and 3 of the drawings.

Figure 6:
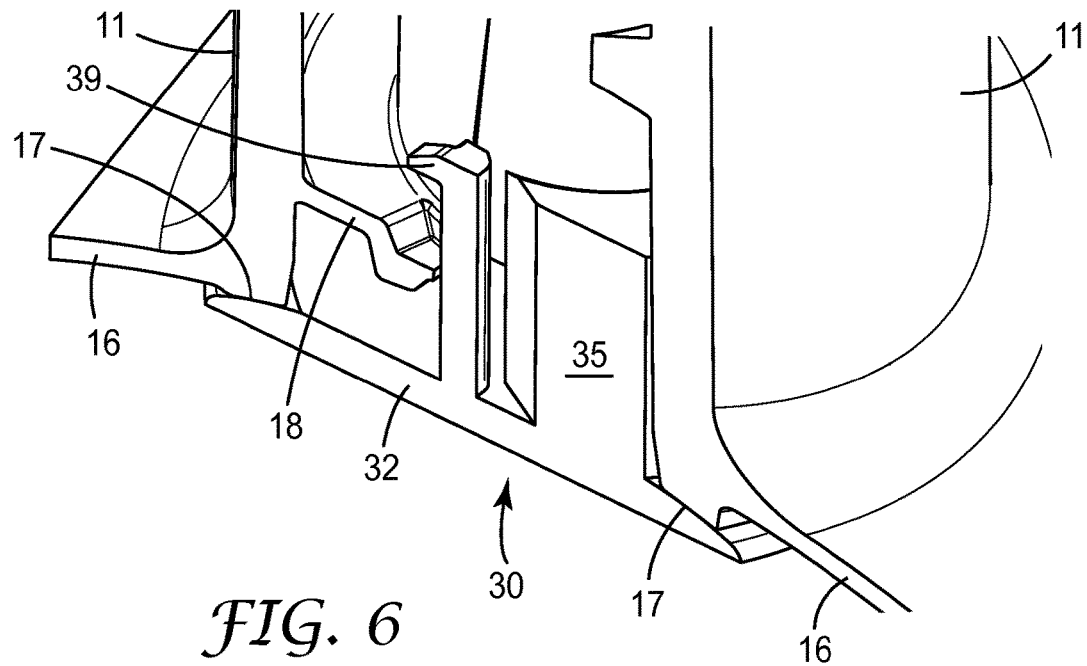
FIG. 6 shows a cross-sectional perspective view of the valve body of FIG. 4 in the closed position of the non-return valve.
Figure 7:
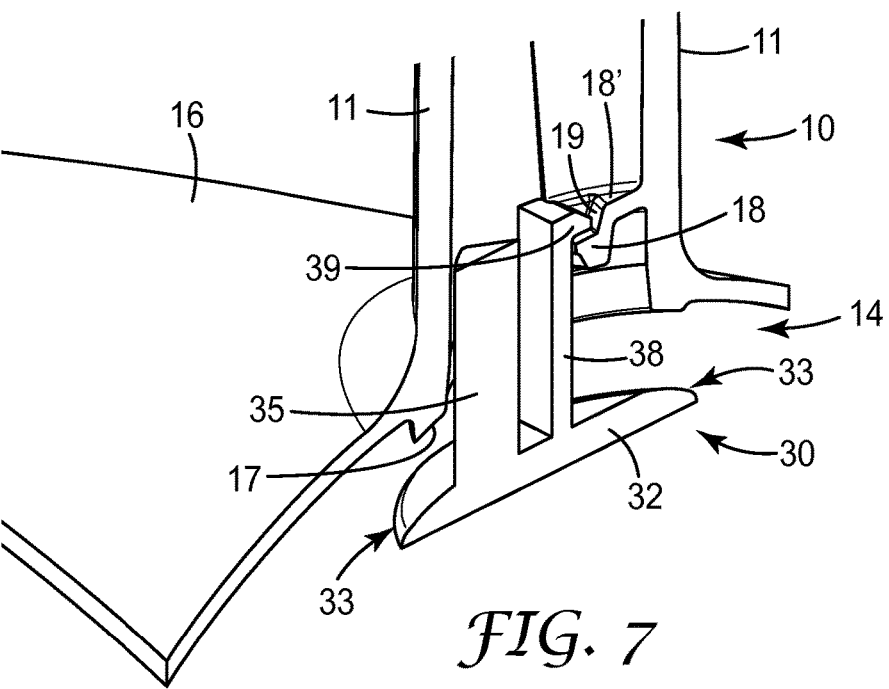
FIG. 7 shows another cross-sectional perspective view of the valve body of FIG. 4 in the open position of the non-return valve.

Continuing with reference to FIGS. 4 to 7, the valve body 30 also includes relatively thin tongue-like latch members 38 upstanding from the plate member 32. Similar to the guide members 35, the relatively thin latch members 38 are typically integrally formed with the plate-like closure member 32, but are resiliently deformable for a latching interconnection of the valve body 30 with the valve housing 10. In this regard, each of the latch members 38 has a small lateral projection or lug 39 at its upper or free end. Referring particularly to FIGS. 6 and 7, upon insertion of the valve body 30 into the outlet opening 14 to assemble the non-return valve 1 of the invention (i.e. in the direction of arrow B in FIG. 1), the resilient latch members 38 can deflect towards the adjacent guide member 35 in a cantilevered fashion to enable the lateral projection or lug 39 to pass a shoulder or projecting edge 18 integrally formed on an inner side of the tubular member 11 of the valve housing 10. Thereafter, the latch member 38 returns under its own elasticity to assume the position shown in FIG. 6. By virtue of this latching effect, the lateral projections or lugs 39 of the latch members 38 then catch or engage with the shoulder or edge 18 of the valve housing 10 in the open position, as shown in FIG. 7. Thus, the shoulder or edge 18 of the valve housing 10 forms a retaining element for holding the valve body 30, albeit loosely, connected with the valve housing 10. The embodiment shown in FIG. 5 differs from the embodiment in FIG. 4 essentially only to the extent that it includes four of the resiliently flexible latch members 38 instead of two. With reference to FIG. 7 of the drawings, the shoulder or inner edge 18 of the tubular valve housing in this embodiment includes a small recess or hollow 19 for accommodating the lateral projection or lug 39 of the respective latch member 38 when the valve body 30 is in the open position. This has the advantage that upper end surfaces of the latch members 38 and the guide members 35 lie in the same plane as an upper surface 18' of the shoulder or inner edge 18, as can be seen in FIG. 7. As a result, the shoulder or inner edge 18 forms a direct stop for an end of the nozzle 3 during use in a resin injection system 100, as will be described further below.

Referring now to FIGS. 8 to 11 of the drawings, the operation of the valve 1 of the present invention will be more fully described with reference to its use in a resin injection system 100 according to an embodiment of the invention for sealing joints in electrical cables. As the skilled person will appreciate, when electrical cables, and in particular medium voltage power cables up to about 8 kV, are joined or repaired in situ (e.g. installed underground), it is necessary to remove a section of the protective outer covering and insulation in order to effect a cable joint between the core conductors of the cable. After the conductors have been joined, however, it is again necessary to seal the exposed parts of the cable to ensure both electrical insulation and protection from physical and environmental influences. The resin injection system or resin pressure system 100 of the present invention is especially suited to this particular application.

The system 100 includes a spacer material 2 which is preferably provided in sheet or strip form (e.g. on a roll) for wrapping around the exposed cable joint (not shown) to be sealed. The spacer material 2 is resilient and is formed to be at least locally permeable to a fluid, such as a resin. In this regard, the spacer material 2 may be porous and/or may be formed having an open mesh-like structure to readily permit flow of fluid/resin there-through. Thus, the spacer material 2 is wrapped around the exposed cable joint to create a resilient or 'springy' layer of spacer material 2 in the area to be sealed. The non-return valve 1 is then placed on the spacer material 2 surrounding the cable joint such that the valve footing formed by the flange member 16 supports the valve 1 on the spacer material 2. The flange member 16 can be seen in FIG. 1 to have a curved profile to suit its use on cylindrical cable joints wrapped with spacer material 2. That is, the curved form of the flange 16 is designed to suit the curved outer profile of the cable.

Figure 8:
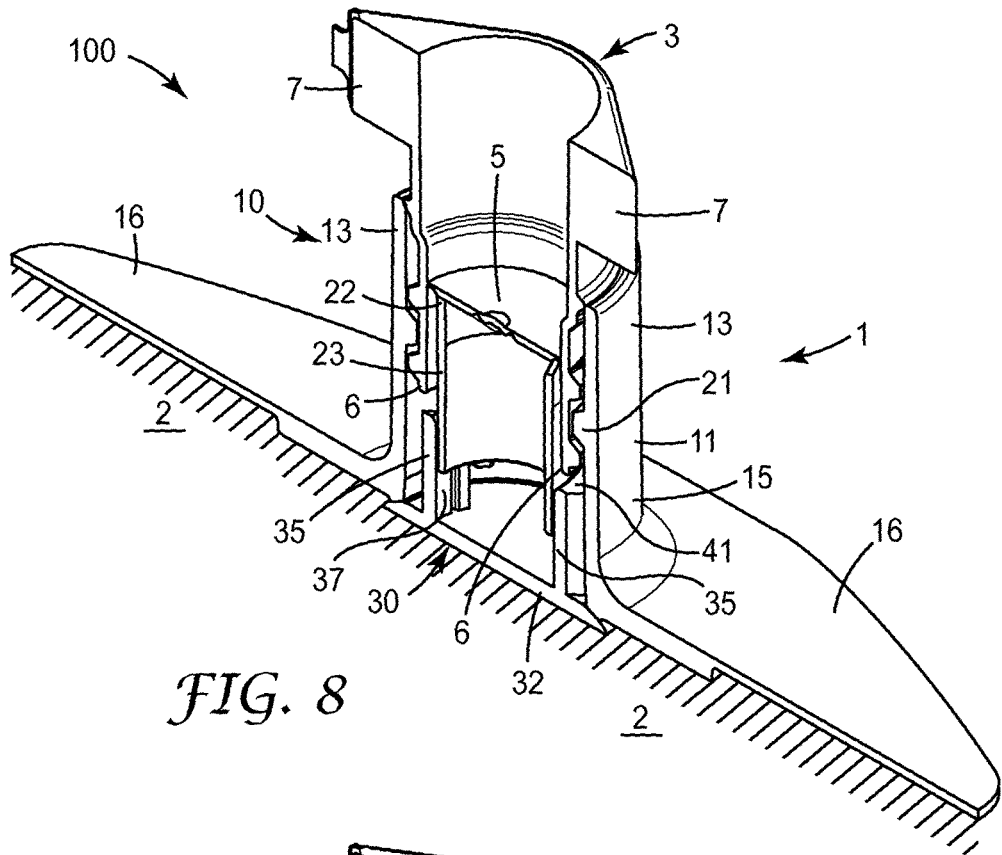
FIG. 8 is a cross-sectional perspective view of a resin injection system according to an embodiment of the invention with the non-return valve of FIG. 1 shown in the closed position.
Figure 10:
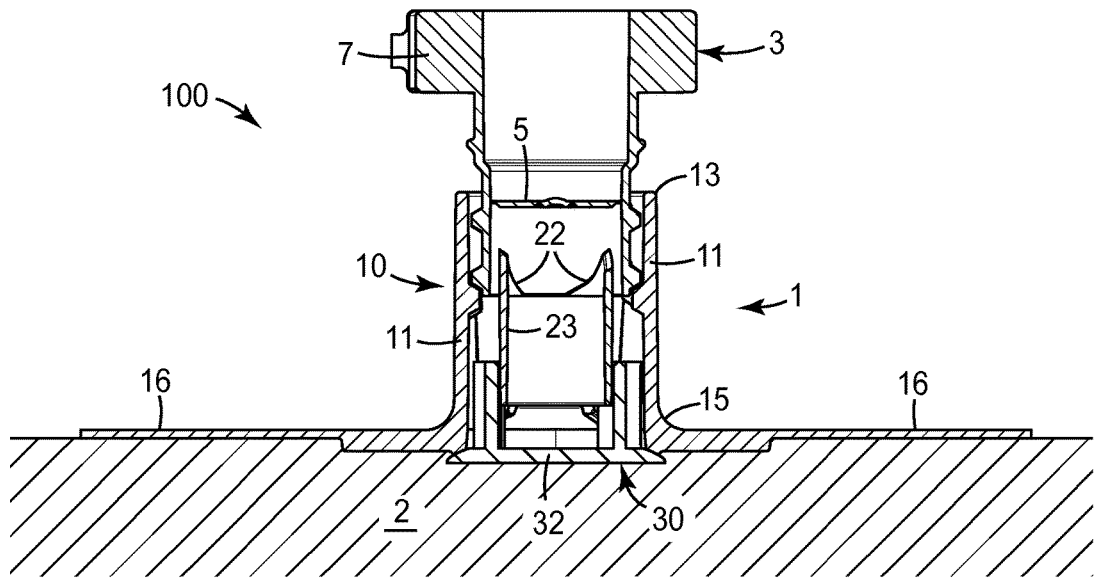
FIG. 10 shows a cross-sectional view of the resin injection system of FIG. 8 with the non-return valve shown in the closed position.

The valve housing 1 is placed on the porous or permeable spacer material 2 and the loosely held connection of the valve body 30 with the housing 10 naturally causes the valve body 30 to assume the closed position as shown in FIGS. 8 and 10. The valve 1 can be fixed in position on the spacer material 2 by wrapping an adhesive tape (not shown) around the outside of the spacer material 2 and over the flange 16 of the non-return valve 1. By covering the entire area of the cable joint with an appropriately selected adhesive tape, not only can the spacer material 2 be reliably fixed in position around the cable joint, but the cavity occupied by the spacer material 2 can be enclosed by the tape to form a confined area for accommodating a sealing resin.

In this regard, the system 100 of the present invention includes a curable fluid resin which is typically provided in a flexible container (not shown) having a spout or nozzle 3 as shown in FIG. 1 and in FIGS. 8 to 11. As is particularly apparent from FIG. 1, the nozzle 3 has an external screw thread 4 and, as can be seen in FIGS. 8 to 11, this screw thread 4 is adapted to cooperate with an internal screw thread 21 inside the upper end region 13 of the tubular member 11 of the valve housing 10. Thus, as shown in FIG. 8 and FIG. 10, the nozzle 3 of the resin container is not only configured to be inserted into and receive within the inlet 12 of the valve housing 10, the nozzle 3 is configured to be screwed into inlet 12 such that the container nozzle 3 and the valve housing 10 are connected with one another.

As can be seen in FIG. 8 and FIG. 10 of the drawings, the nozzle 3 includes a disc-shaped membrane 5 which forms a seal for the contents of the container. When the nozzle 3 is screwed into the inlet 12 of the valve housing 10, one or more pointed blade member 22 at an upper end of an inner cylindrical structure 23 formed in the valve housing 10 pierces and cuts away the disc-shaped membrane 5 to permit flow of the fluid resin out of the container and into the valve 1.

Figure 9:
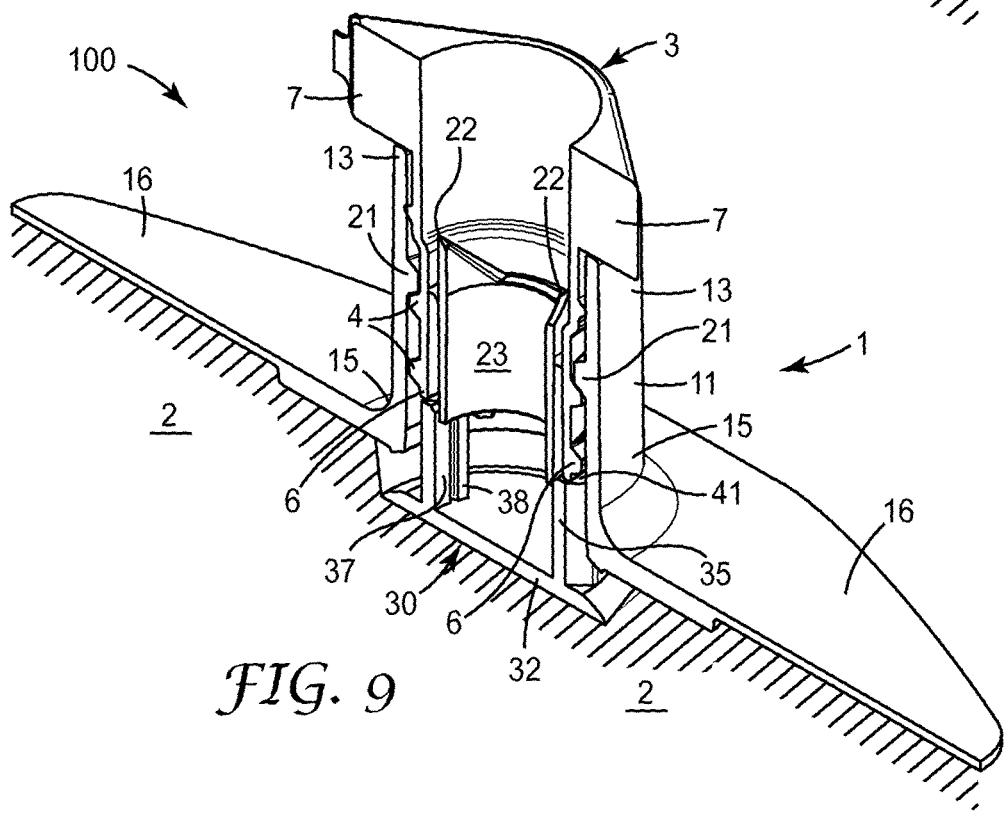
FIG. 9 is a cross-sectional perspective view of the resin injection system of FIG. 8 with the non-return valve shown in the open position.
Figure 11:
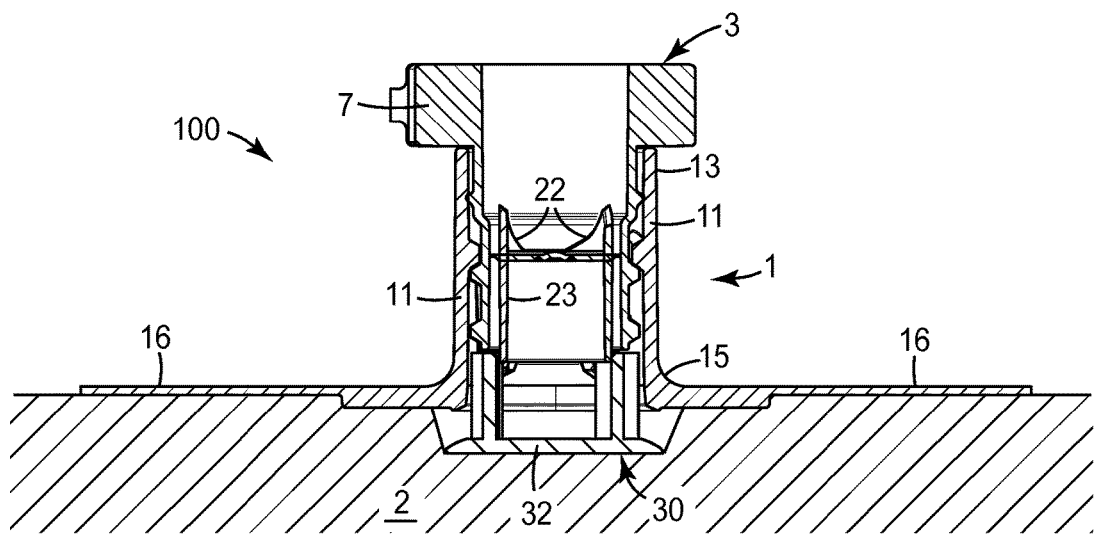
FIG. 11 shows a cross-sectional view of the resin injection system of FIG. 8 with the non-return valve shown in the open position.
Figure 12A:
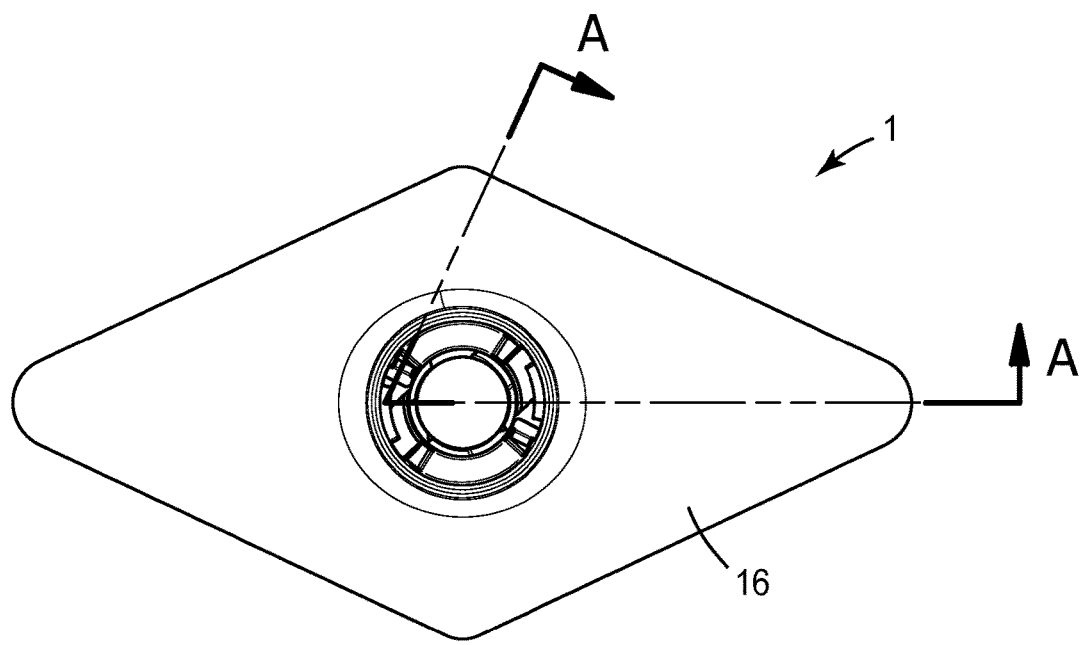
FIGS. 12a & 12b shows a plan view and a cross-sectional view along lines A-A, respectively, of a non-return valve according to the invention in the closed position.
Figure 12B:
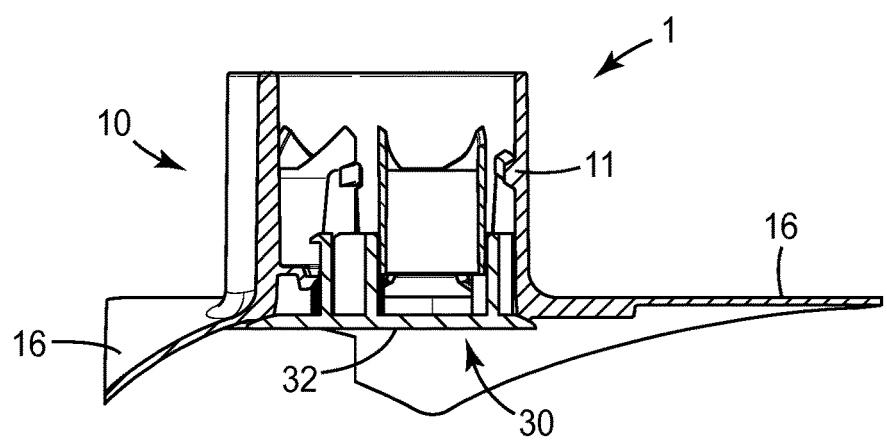
Figure 13A:
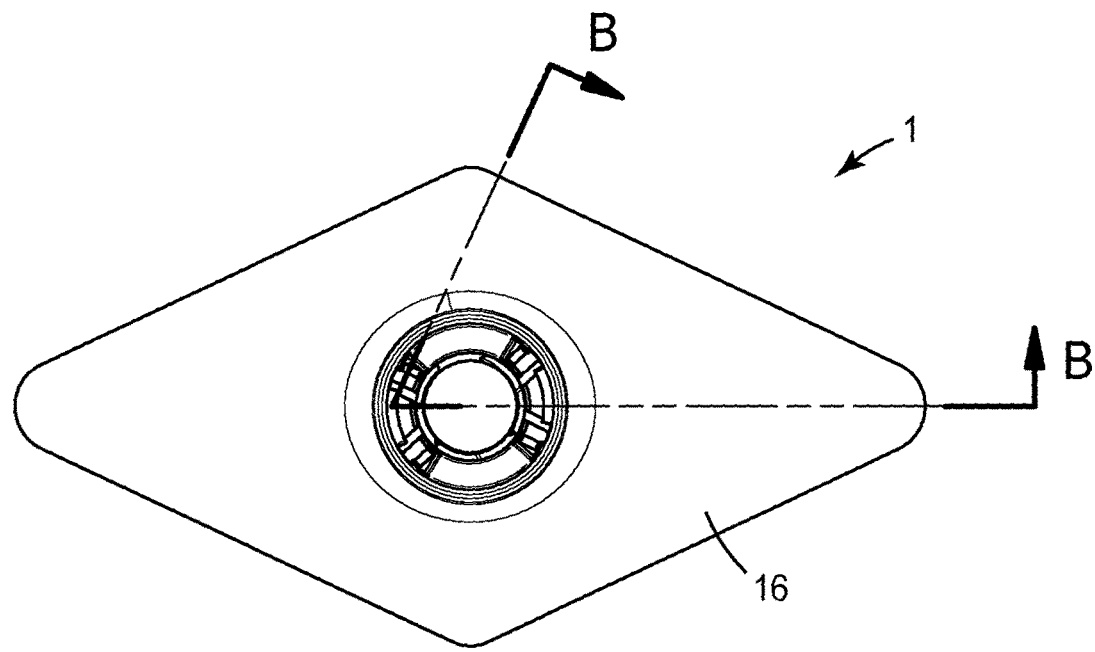
FIGS. 13a & 13b shows a plan view and a cross-sectional view along lines B-B, of a non-return valve according to the invention in the open position.
Figure 13B:
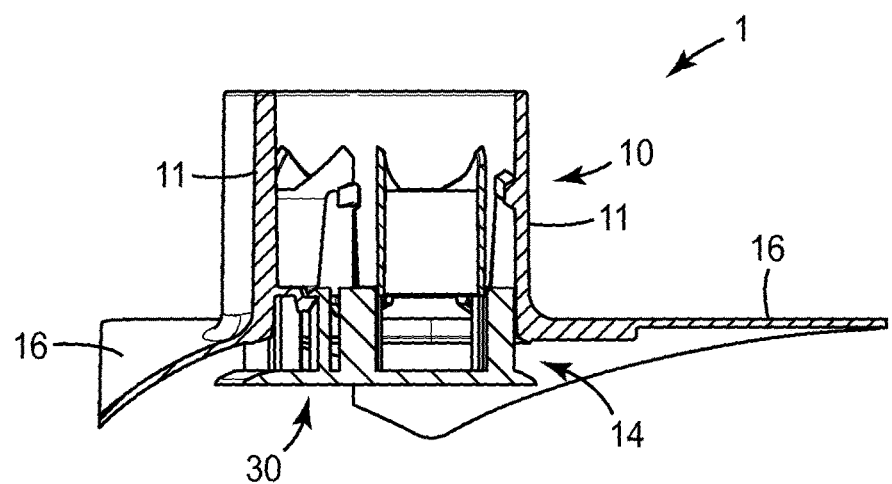

Furthermore, as the nozzle 3 is screwed into the inlet 12 of the valve housing 10, a distal end or edge 6 of the nozzle comes into contact with an upper engagement surface 41 of each of the block-like guide members 35 upstanding from the plate member 32 of the valve body 30. Accordingly, by screwing the nozzle 3 of the resin container fully into the valve housing 10 as shown in FIG. 9 and FIG. 11 of the drawings (i.e. until the lateral wing-like portions 7 of the nozzle 3 engage the upper end region 13 of the tubular member 11 of the valve housing 10 and/or distal end or edge 6 of the nozzle 3 contacts the upper surface 18'), the distal edge 6 of the nozzle 3 pushes the valve body 30 via the guide members into the resilient spacer material 2, which in turn deforms resiliently under the force imparted by the insertion of the nozzle 3, such that the valve body 30 moves to the open position. In this connection, it will be noted that the inner cylindrical structure 23 of the valve housing 10 having the pointed blade members 22 at its upper edge cooperates with the cylindrical wall of the tubular member 11 to define a guide channel for the guide members 35. That is, the partially cylindrical inner surfaces 37 of the guide members 35 have a diameter slightly larger than the outer diameter of the cylindrical structure 23, so that the guide members 35 are loosely but closely guided there-between as the valve body 30 moves between the closed and open positions. The above described functionality of the valve 1 does not only work when the spacer material has been sufficiently filled with the fluid resin but also during the process, when for example a resin bag needs to be changed because it is empty.

With the non-return valve 1 now in the open position, the curable fluid resin is introduced under pressure via the inlet 12 through the valve 1 and into the spacer material 2 around the cable joint by pressure from the resin container, e.g. by squeezing the resin container by hand. The resin flows through the valve 1 and out through the outlet 14 to permeate the spacer material 2 until the fluid resin fills the entire cavity enclosed by the tape. The tape itself is typically transparent and the resin material may be coloured to enable an operator to visually follow the progress of the resin through the spacer material 2 as it gradually fills the entire region surrounding the cable joint. Once the spacer material has been sufficiently filled with the fluid resin, the container nozzle 3 is separated from the non-return valve 1 by unscrewing the nozzle 3 from its connection with the valve housing 10. After the nozzle is unscrewed and removed from the valve housing 10, the distal edge 6 of the nozzle 3 no longer bears upon the engagement surfaces 41 of the guide members 35 of the valve body. Accordingly, the valve body 30—which is acted upon by the force of the resilient spacer material 2—is then pushed from the open position shown in FIG. 9 and FIG. 11 back up to the closed position shown in FIG. 8 and FIG. 10. That is, the spacer material 2 pushes on the closure member 32 of the valve 1 to move the valve body 30 back to the closed position.

In FIGS. 12a & 12b and 13a & 13b of the drawings, the non-return valve 1 of the embodiment discussed in detail above is illustrated in the closed and open positions in plan views and in alternative sectioned views for a more complete impression of the preferred valve configuration.

Figure 14:
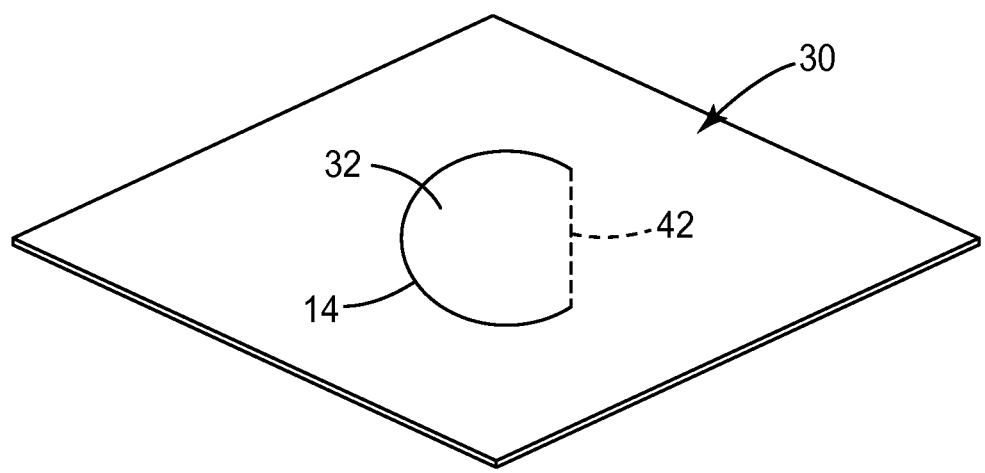
FIG. 14 illustrates a modified non-return valve concept for use in a resin injection system of the invention in a closed position.
Figure 15:
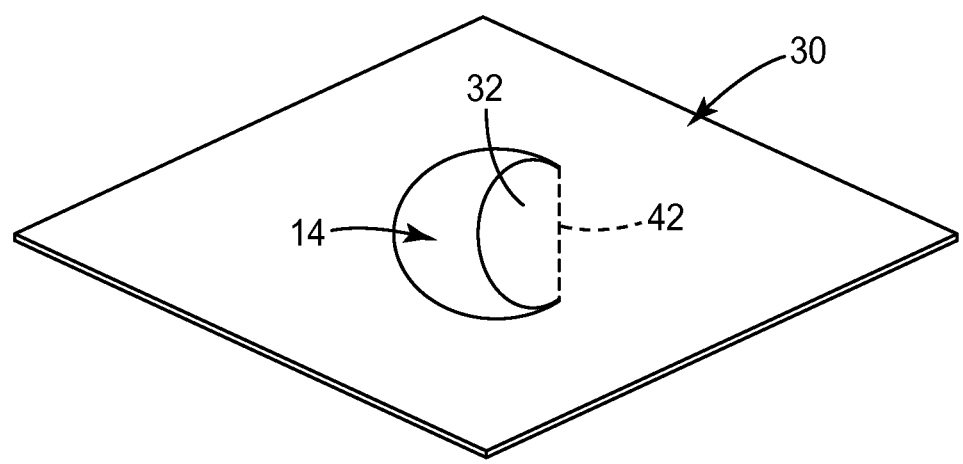
FIG. 15 illustrates the modified non-return valve concept of FIG. 14 in an open position.

With reference now to FIGS. 14 and 15 of the drawings, a modified non-return valve concept is illustrated for use in a resin injection system 100 according to the invention. In this embodiment, a valve body 30 as shown in FIGS. 14 and 15 is combined with a valve housing 10 similar to that of the non-return valve 1 shown in FIGS. 1 to 13, but without the shoulder or inner edge 18. The valve body 30 described in the previous embodiments is therefore omitted. With this concept, the valve body 30 is made of a thin sheet material, which may be somewhat stiff to retain its form but nevertheless retains flexibility; e.g. it may comprise a polymer plastic sheet or plate material, not dissimilar to the flange member 16. The valve body 30 in this embodiment is indeed configured to be arranged immediately adjacent the flange 16 of the valve 1 centred below the tubular member 11 of the valve housing 10. The valve body 30 of this embodiment may also optionally be integrally formed with the flange member 16, so that such a clear physical distinction between the valve body 30 and the valve housing 10 may not exist for this embodiment as it does in the embodiments described above.

The valve body 30 of this embodiment has a closure member 32 which is connected to the rest of the diamond shaped valve body 30 via hinge connection 42, such that closure member 32 is freely movable (i.e. pivotally) between a closed position as shown in FIG. 14, in which an outlet 14 from the valve 1 is sealed or closed against return fluid flow there-through, and an open position as shown in FIG. 15, in which outlet 14 is open to fluid flow there-through. As is apparent from the drawings, the closure member 32 of the valve body 30 in this embodiment substantially fully covers or obstructs outlet 14 in the closed position and is preferably configured such that it is only pivotally movable at the hinge connection 42 in the downwards direction, i.e. towards the spacer material 2 in use, and not upwards into the tubular member 11. Such a limit on the pivotal movement of the closure member 32 can be achieved via appropriate design of the hinge connection 42 and/or by a tapered design of the outlet opening 14 through the valve body 30 and/or by the inclusion of a suitable stop member to stop the closure member 32 in the closed position.

In use, the nozzle 3 of the resin container is again screwed into the upper end region 13 of the tubular member 11 via the inlet 12 of the valve housing 10. As the valve body 30 of this embodiment is flat and located adjacent the flange 16, either nozzle 3 needs to be longer or the tubular member 11 needs to be shorter so that the end 6 of the nozzle 3 engages the closure member 32 and acts to move or push the closure member 32 from the closed position in FIG. 14 to the open position in FIG. 15 against the resilient bias of the spacer material 2, as described above. In this position, the resin can be introduced, e.g. under pressure, into the cable joint. After the spacer material 2 and the cavity around the cable joint has been filled with resin and the nozzle 3 is removed, e.g. unscrewed, from the valve housing 10, the closure member 32 in this embodiment pivots back to the closed position under the bias force of the resilient spacer material 2 which was compressed by the closure member 32 in the open position.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects. The terms "upper" and "lower" as used herein are intended to be understood in the sense of the orientation of the invention illustrated in the drawings.

The resin injection system of the invention may be embodied as a cable jointing kit. It will be appreciated, however, that the non-return valve and the resin injection system of the present invention are not limited to use in the joining of electrical cables, but may be employed in a range of applications, including, for example, in pipe or conduit repair, and in the sealing of communication lines.

The invention claimed is:

1. A resin injection system for sealing a joint or breach in an electrical cable, comprising:
   a spacer material for application to the joint or breach, the spacer material being resiliently deformable and at least locally permeable to a fluid;
   a non-return valve, for positioning on the spacer material applied to the joint or breach; and
   a fluid resin for introduction through the valve into the spacer material applied to the joint or breach,
   wherein the non-return valve comprises:
   i. a valve housing which includes an outlet for a fluid flowing through the valve; and
   ii. a valve body which is held by the valve housing and is freely movable between a closed position, in which the outlet is substantially sealed or closed to fluid flow by the valve body, and an open position, in which the outlet is substantially open to fluid flow,
   wherein the valve housing comprises a flange member configured as a footing to support the valve on the spacer material of the resin injection system, and
   wherein the valve body is configured to seat against the flange member in the closed position and/or to project beyond the flange member in the open position.

2. A resin injection system according to claim 1, wherein the spacer material is formed in as a substantially flexible sheet or strip which is able to be wrapped around the cable joint or breach to be sealed, the spacer material being substantially porous and/or having an open mesh-like structure.

3. A resin injection system according to claim 1, comprising means for substantially confining the fluid resin introduced into the spacer material applied to the joint or breach to retain the resin localised at the joint or breach until the resin cures, wherein the confining means comprises a fluid impermeable cover layer for covering or enclosing the spacer material applied to the joint or breach and for preventing escape of the fluid resin.

4. A resin injection system according to claim 1, wherein the fluid resin is provided in a container having an outlet which is insertable into the valve housing of the non-return valve for introduction of the resin through the valve and into the spacer material applied to the joint or breach, wherein the outlet of the resin container is configured to interact with the non-return valve to move the valve body to the open position.

5. A resin injection system according to claim 1, wherein the valve body is not biased to the closed position.

6. A resin injection system according to claim 1, wherein the valve body includes a contact member which projects beyond or out of the valve housing in the open position for contact with the spacer material of the resin injection system.

7. A resin injection system according to claim 1, wherein the valve body includes a closure member which is larger than the outlet such that the closure member substantially fully covers and/or obstructs the outlet in the closed position.

8. A resin injection system according to claim 7, wherein the closure member comprises a plate member having a diameter which is larger than a diameter of the outlet, such that the plate member substantially fully covers the outlet in the closed position.

9. A resin injection system according to claim 1, wherein the valve housing comprises a tubular member and the valve body is at least partially held and movable within the tubular member, wherein the outlet of the valve is at one end region of the tubular member.

10. A resin injection system according to claim 9, wherein a valve seat against which the valve body is configured to engage or to seat in the closed position surrounds the outlet at said end region of the tubular member, wherein the flange member extends radially outwardly from said end region of the tubular member.

11. A resin injection system according to claim 1, wherein the valve housing includes an inlet configured to receive a nozzle or spout of a resin container for introducing resin through the valve, the inlet comprising connection means for effecting mechanical connection with the nozzle or spout.

12. A resin injection system according to claim 1, wherein the valve body includes at least one latch member for engagement with a retainer element of the valve housing to limit movement of the valve body to the open position and to retain the valve body in connection with the valve housing.

13. A resin injection system according to claim 12, wherein the valve body includes a closure member, and wherein the at least one latch member is elongate and extends from the closure member of the valve body into the valve housing in a direction parallel to the direction of movement of the valve body between the closed position and the open position, wherein the at least one latch member is resiliently deformable and includes a lateral projection at an end region thereof for engagement with the retainer element of the valve housing in the open position, the retainer element comprising a radially inwardly projecting shoulder or edge region in the valve housing.

14. A resin injection system according to claim 1, wherein the valve body includes one or more guide member for assisting movement of the valve body from the closed position to the open position, wherein each guide member presents an engagement surface for engagement by a nozzle or spout of a resin container inserted into the valve housing, such that the valve body can be moved or pushed by the nozzle or spout into the open position.

* * * * *

UNITED STATES PATENT AND TRADEMARK OFFICE
CERTIFICATE OF CORRECTION

Page 1 of 1

PATENT NO. : 9,570,894 B2
APPLICATION NO. : 14/384403
DATED : February 14, 2017
INVENTOR(S) : Bernd Schubert It is certified that error appears in the above-identified patent and that said Letters Patent is hereby corrected as shown below:

In the Specification

Column 5, Line 6-11:
Delete "The resin injection system of the invention is desirably provided in the form of a kit. Thus, in still a further aspect, the invention provides a resin pressure or injection kit for sealing a localised joint or breach in an object, and especially a cable jointing kit for sealing cable joints." and insert the same on Column 5, Line 7, as a new paragraph.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*